Feb. 9, 1954   R. H. FORBES   2,668,356
MEANS FOR MARKING GLASS TUBES
Filed April 24, 1951   4 Sheets-Sheet 1

INVENTOR
RICHARD H. FORBES
BY H. L. Godfrey
ATTORNEY

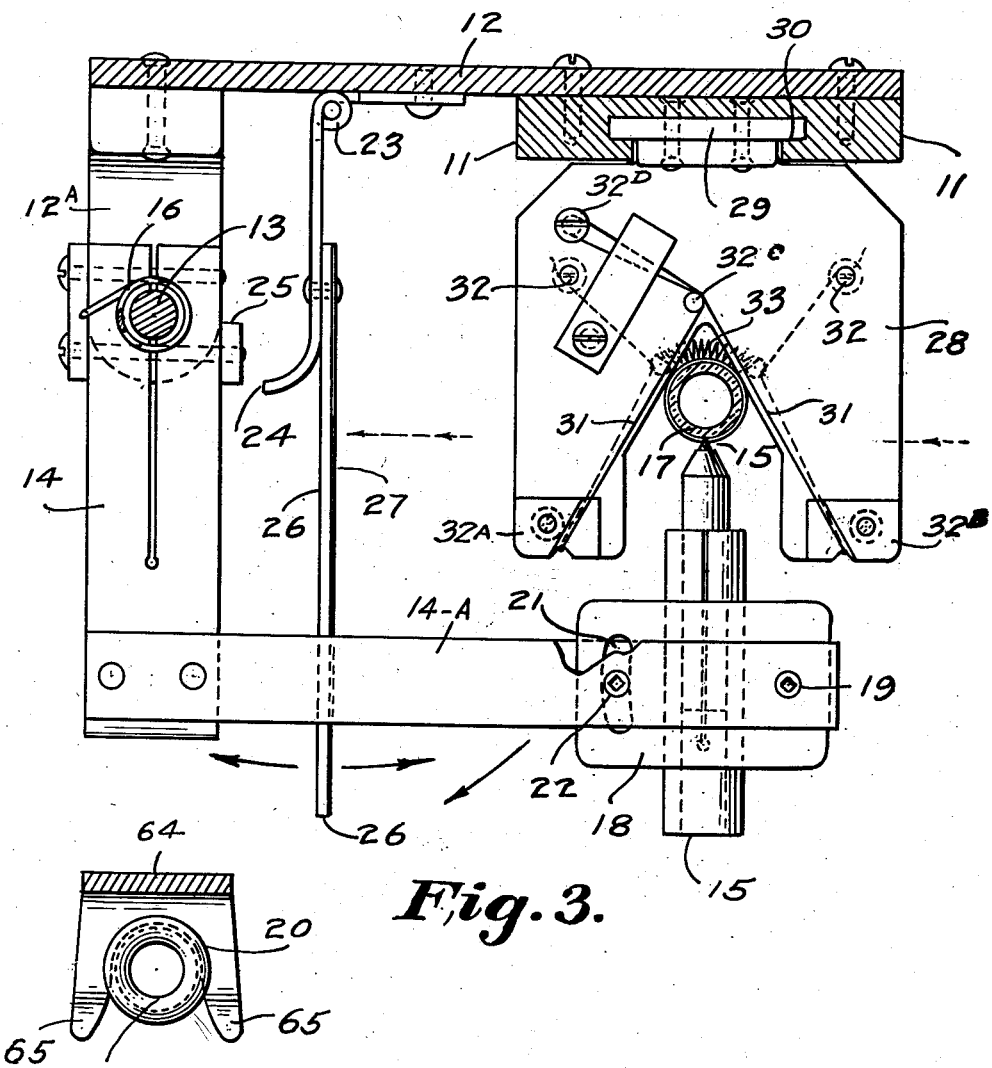

Feb. 9, 1954   R. H. FORBES   2,668,356
MEANS FOR MARKING GLASS TUBES
Filed April 24, 1951   4 Sheets-Sheet 3
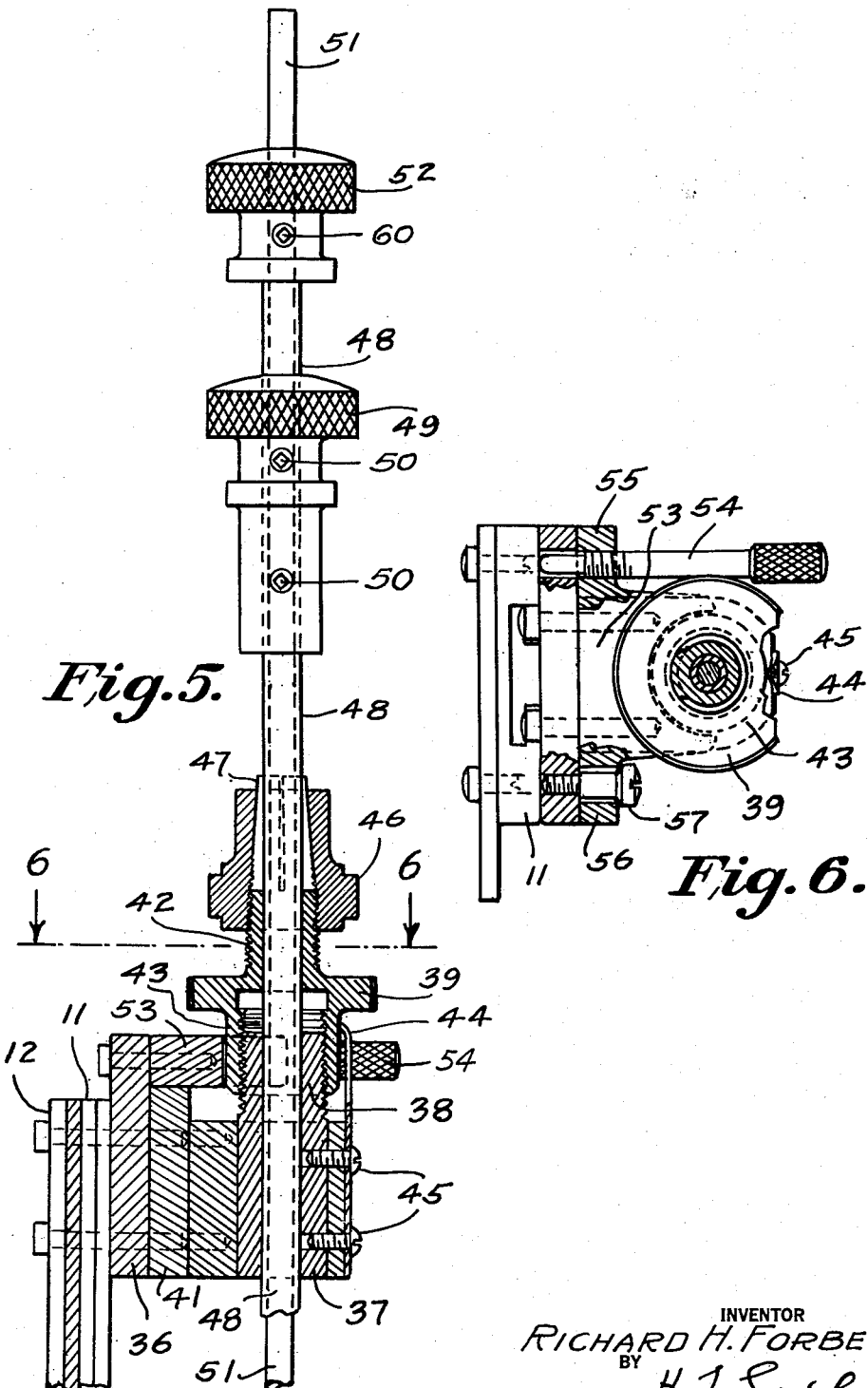
INVENTOR
RICHARD H. FORBES
BY
H. L. Godfrey
ATTORNEY Feb. 9, 1954 — R. H. FORBES — 2,668,356
MEANS FOR MARKING GLASS TUBES
Filed April 24, 1951 — 4 Sheets-Sheet 4

INVENTOR
RICHARD H. FORBES
BY
H. L. Godfrey
ATTORNEY

Patented Feb. 9, 1954

2,668,356

UNITED STATES PATENT OFFICE 2,668,356

MEANS FOR MARKING GLASS TUBES

Richard H. Forbes, Newton, Mass., assignor to the United States of America as represented by the Secretary of the Treasury Application April 24, 1951, Serial No. 222,723

3 Claims. (Cl. 33—21)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (ch. 460, 45 Stat. L. 467).

My invention relates to a device for scratching calibration marks on surfaces of revolution having flanged ends and particularly on laboratory receptacles. Such receptacles usually have a neck portion which, like a medicine dropper, may be broadly considered "glass tubing with a flanged end."

The etching method of marking calibrations on glass has little if any roughening effect on some of the more recently developed glasses used in laboratory apparatus and neither varnish nor pigmented cement suitable for filling etched grooves is resistant to wetting in solvents and frequent wetting and wiping.

A primary object of my method of marking and of my apparatus is to form surface calibration bands of scratches of a minimum cut by a diamond or similar tool which is lightly pressed on the glass surface to avoid cutting weakening grooves or disturbing the structure of the glass by the tool or by etching deep grooves. Such weakening of tubular articles by grooving or disturbing the structure along lines of calibration localizes the strains produced by any bending stresses to which a tubular calibrated article may be subjected. In the prior art, relatively deep calibration grooves have been filled with some pigmented cement which dries to a hard ring without strengthening the article.

Shallow etched grooves are unsuited for filling with pigmented cement and are also unsatisfactory because such uncoated grooves produce, for laboratory use, bands of inadequately contrasting appearance.

My invention provides a novel apparatus, by means of which bands of shallow scratches may be made in a glass surface to form precisely located calibration marks. This apparatus includes means which enable an operator to precisely align a scratching tool with a selected zero point on the surface of a receptacle, a means for at will precisely moving the supported work with respect to the scratching tool and means for supporting and guiding the work with respect to a scratching tool.

In the accompanying drawings which illustrate a preferred embodiment of my invention:

Figure 3 is a further enlarged section on the line 3—3 of Figure 1.

Figure 4 is an enlarged section on the line 4—4 of Figure 2.

Figure 5 is an enlarged detail, partly in section, of an elevation controlling mechanism for suspended work.

Figure 6 is a section on the line 6—6 of Figure 5.

Figure 1:
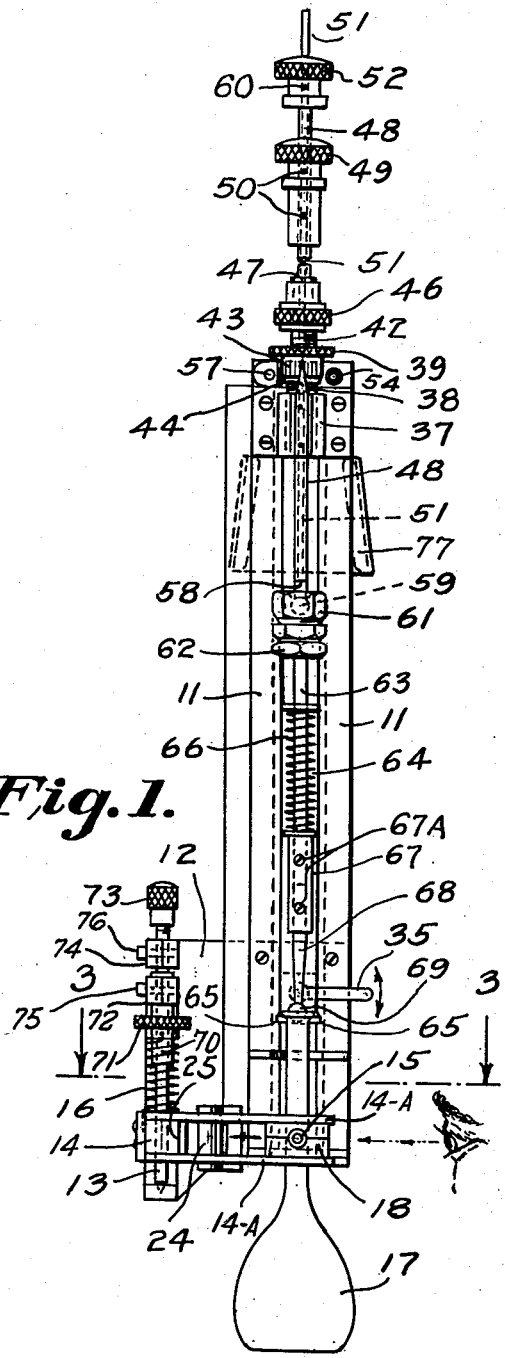
Figure 1 is an elevation of my device in which is clamped a volumetric flask having a tubular neck and a flanged mouth, preparatory to scratching a zero mark on the tubular neck of the flask.

A base member 11 serves to support each of the elements of my device in proper position with respect to each of the cooperating elements. Rigidly secured to the lower end of the base member 11 is a laterally extending bracket 12. There is rigidly mounted on the bracket 12 an extension 12-A on which is mounted a pivot 13 for a slotted scriber arm 14 having a bifurcated extension 14-A which extension carries a rigidly clamped scratching tool 15. A coiled spring 16 encloses the pivot 13 and resiliently presses the scratching tool 15 against the surface of a flask 17.

The bifurcated arm 14-A is provided with grooved terminal tool clamping blocks 18, each having a circular aperture for a clamping bolt 19 and an arcuate slot 21 for a companion clamping bolt 22 to provide limited angular adjustment of the clamping blocks 18 on the supporting arms 14-A. A hinge 23 is mounted on the bracket 12 and terminates in a terminally curved latch member 24 which engages behind a stop 25 to releasably hold the scriber arm 14 when swung on the pivot 13 to inoperative position against the resilient pressure of the spring 16. The latch 24 is manually operated by means of a handle extension 26 which may have a mirrored or enameled surface 27 on the side facing the supported work.

Rigidly mounted at the lower end of the base member 11 is a fixed guide 28 provided with a lateral V-shaped notch which guides and laterally supports an article while being scratched and is also provided with an extension 29 which fits in a T-shaped slot 30 of the base member 11.

Figure 2:
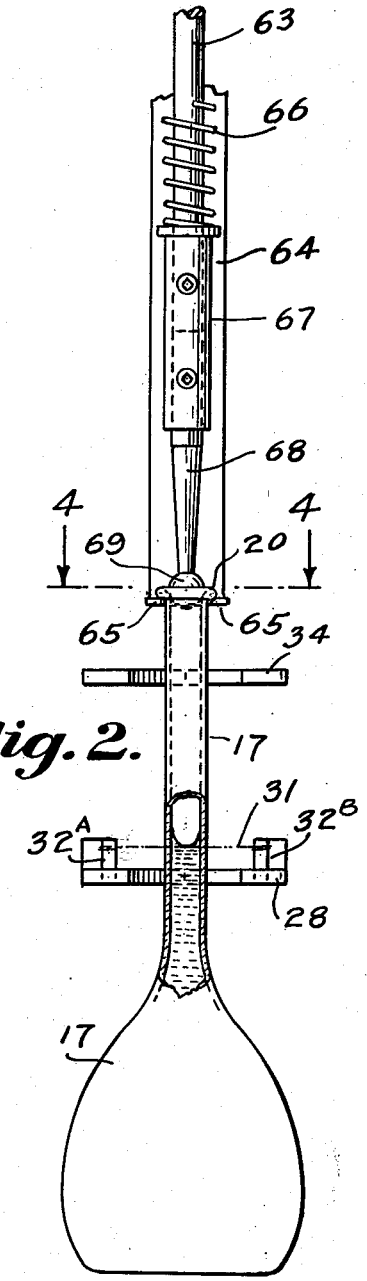
Figure 2 is an enlarged detail showing the flask clamping support, and diagrammatically shows a fixed centering means which supports two portions of a sighting wire, and a second centering means which is vertically adjustable.

A V-shaped sighting wire 31 (see Figures 2, 3 and 7) is parallel with the fixed guide 28 and is supported thereby on grooved blocks 32A, 32B, and studs 32C and 32D. Extensions of the sighting wire 31 pass beneath the fixed guide 28 and are anchored on two downwardly extending studs 32. A slack regulating tension spring 33 serves the dual purposes of taking up the slack in each extension of the sighting wire 31 and also of resiliently opposing the movement of the flask 17 when pressed by the scratching tool 15.

A movable guide 34 having a V-shaped notch is mounted in the T-shaped groove of the base member 11 and is provided with a clamp which is manually operated by means of a lever 35 to releasably lock the guide 34 to the base member 11.

Figure 7:
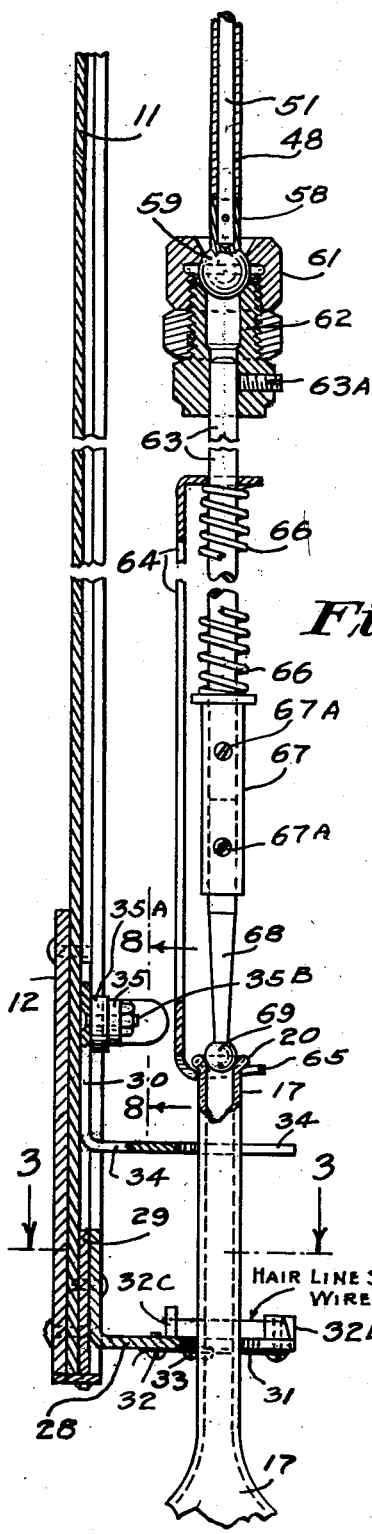
Figure 7 is an enlarged detail view partly in section on a plane perpendicular to the picture plane of Fig. 1.
Figure 8:
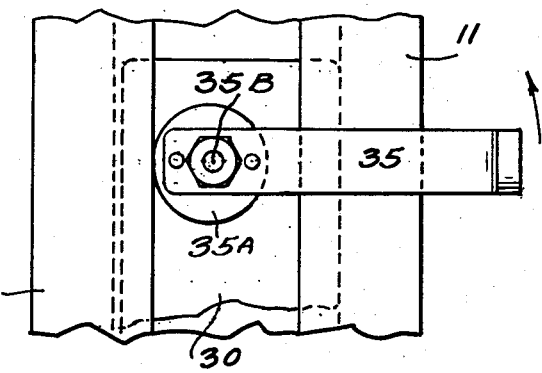
Figure 8 is an enlarged detail front elevation looking in the direction 8—8 on Figure 7, showing the manually operated locking device for a movable article-supporting guide in locking position.

Figures 7 and 8 on enlarged scales illustrate a manually operated clamp for the movable guide 34 which comprises an eccentric member 35A which is clamped to the lever 35 by a bolt 35B. In these figures the clamp is shown in operative position.

An upper laterally extending bracket 36 and spacing block 41 are rigidly supported by the base member 11 and in turn support the work suspending mechanism. The spacing block 41 is provided with an aperture for a sleeve 37 provided with an externally threaded extension 38. A micrometric height-adjusting means comprising internally threaded height adjusting wheel 39 is provided with an internally threaded skirt portion 43 which bears a plurality of external calibrations which are parallel with the axis of the wheel and is provided with an externally threaded chuck supporting extension 42. A pointer 44 is fastened to the block 41 by two screws 45 which also rigidly unite the block 41 and the sleeve 37.

A chuck operating sleeve 46 is mounted on the extension 42 and encloses a plurality of tapered chuck elements 47. An outer tubular shaft 48 passes through the aligned sleeve 37, the extension 42 and the chuck sleeve 46.

A tubular shaft adjusting knob 49 is clamped to the shaft 48 by one or more set screws 50. Within the shaft 48 there is an inner shaft 51 upon which there is clamped an adjusting knob 52 by means of a set screw 60.

The micrometric height adjusting wheel 39 is at will held against rotation by a manually operated brake comprising a brake shoe 53 (see Figures 5 and 6) which is clamped against the skirt portion 43 by turning a bolt 54 having a knurled handle which is threaded into an ear 55 of the brake shoe 53.

A second brake shoe ear 56 loosely receives an attaching slotted bolt 57 and permits limited angular clamping movement of the brake shoe 53.

The lower end of the inner shaft 51 fits within a tubular extension 58 of a terminal ball 59 and may be held therein by a transverse pin. Over the ball 59 there is fitted an internally threaded socket 61 into which an externally threaded sleeve 62 is detachably fastened to form a flexible joint. A suspending shaft 63 is detachably secured within the sleeve 62 by a set screw 63A. The shaft 63 passes through an aperture in an article suspending bracket 64 which bracket terminates in two upwardly inclined prongs 65. Surrounding the shaft 63 is a compression spring 66 and a terminal sleeve 67 provided with set screws 67A which serves the dual purpose of one abutment for the spring 66 and a means for attaching a selected tip 68 having a terminal ball 69. Because of variations of the internal diameters of laboratory flask mouths, a plurality of tips 68 with varying diameter terminal balls 69 are selectively used to form a work supporting clamp.

The tension on the spring 16 is regulated by winding a knurled sleeve 71 enclosing the pivot 13 which sleeve is provided with an abutment for the spring 16. The sleeve 71 is clamped against rotation by a clamping screw 75 in a slotted bracket 72 mounted on and extending forwardly from the bracket 12. An externally threaded bolt 73 provided with a terminal pivot bearing and a knurled operating handle is mounted in a slotted, internally threaded bracket 74 which bracket is rigidly mounted upon the bracket 12. A clamping screw 76 in the bifurcated bracket 74 provides a means for retaining a bearing of the bolt 73 in any adjusted position. A split collar 72 is mounted on the sleeve 70 and is releasably fastened thereto by a set screw 75.

One method of using my device for scratching calibration bands on a neck of a laboratory flask with a flared mouth will be described as an example of the use of my apparatus. The apparatus is mounted with the rack 11 vertical, and the mouth 26 of the flask 17 supported by the prongs 65 (see Figure 2) and resiliently held against upward movement by the terminal ball 69.

In this figure, liquid partially fills the neck and the bottom of the meniscus is selected as a zero point. The height of the meniscus is brought to an approximate alignment with the plane of the sighting wire 31 by releasing the outer shaft 48 by turning the chuck operating sleeve 46 and manually moving the shaft 48 while sighting across the wire 31, as indicated by the image of an eye in Figure 1. The sleeve 46 is then turned to clamp the tubular shaft 48 and the brake releasing bolt 54 is turned to release the height adjusting wheel 39 by which the flask 17 is raised or lowered to bring the level of the meniscus of liquid in the flask neck into exact alignment with the common plane of the wire 31 and the tip of the scriber 15, the enameled or mirrored surface 27 assisting in this sighting operation.

After this alignment of the liquid level in the flask neck with the scriber point has been completed, the brake shoe is again clamped against the skirt 43 and the handle 26 is used to release the scriber arm 14 and permit the scratching tool to bear lightly against the surface of the work piece which is then manually revolved to produce a fine scratch which establishes one margin of the zero calibration. By successively manipulating the brake-operating bolt 54, the height adjusting wheel 39 and manually turning the article to be marked while the scratching tool 15 is resiliently pressed against the surface of the article, there is produced an opaque band of shallow scratches of a suitable width for a distinctly defined calibration. Additional graduations are produced by repeating the method described for making the zero graduation. These scratches have very little, if any, perceptible weakening effect on the bottle neck.

The base member 11 is provided with one or more tapered mounting brackets 77 of any usual type suitable for detachably suspending this marking device on a wall or other supporting structure.

The embodiment of my invention which is shown and described is illustrative and obviously modifications may be made without departing from the scope of the invention as set forth in the claims which follow.

What is claimed is:

1. A device for producing graduations on glass articles comprising a base member, a work clamp mounted on said base member adapted to permit manual rotation of supported work, a micrometric means for adjusting the position of said work clamp with respect to said base member, a scratching tool, a laterally extending bracket rigidly mounted on said base member, a scriber arm in which said scratching tool is supported, a pivot connecting said scriber arm with said bracket, resilient means for holding said scratching tool against supported work, a fixed guide, and sighting wires supported by and parallel with said fixed guide for assisting in aligning a zero point of said device with a selected zero point of an article to be graduated.

2. A device for making surface graduations on tubular glass articles by making a plurality of very shallow scratches which comprises a base member adapted to be vertically mounted, an upper terminal laterally extending bracket fastened to said base member, a work-clamping and supporting member mounted on said bracket, a fixed work centering guide mounted on said base member, an adjustable work centering guide mounted on said base member, a scratching tool, means for mounting said scratching tool on said base member and micrometric means for selectively precisely varying the height of said work-clamping and supporting member with respect to said scratching tool.

3. In a device for scratching bands of scratches to form graduations in surfaces of revolution, the combination with a base member, of a fixed work centering guide mounted on said base member, a second work centering guide adjustably mounted on said base member, means for selectively clamping said adjustable guide to said base member, an upper terminal bracket mounted on said base member, a work-clamping and supporting member suspended from said terminal bracket, a micrometric means for selectively precisely varying the height of said work-clamping and supporting member with respect to said base member, a lower laterally extending bracket rigidly mounted on said base member, a scratching tool, a scratching tool support pivotally mounted on said lower bracket, means for resiliently holding the scratching tool against supported work, and means for aligning a selected zero point on said work with the scratching tool.

RICHARD H. FORBES.

References Cited in the file of this patent
UNITED STATES PATENTS

| Number | Name | Date |
|---|---|---|
| 278,845 | Atwater | June 5, 1883 |
| 1,624,549 | Halvorsen | Apr. 12, 1927 |

FOREIGN PATENTS

| Number | Country | Date |
|---|---|---|
| 564,111 | Great Britain | Sept. 13, 1944 |